UNITED STATES PATENT OFFICE.

ANTONIO BASELLI, OF BASEL, SWITZERLAND, ASSIGNOR TO SOCIETY OF CHEMICAL INDUSTRY IN BASLE, OF BASEL, SWITZERLAND.

EARTH-ALKALI SALTS OF DIIODO-FATTY ACIDS OF HIGH MOLECULAR WEIGHT AND PROCESS OF MAKING SAME.

988,066.   Specification of Letters Patent.   Patented Mar. 28, 1911.

No Drawing.   Application filed December 22, 1910. Serial No. 598,826.

*To all whom it may concern:*

Be it known that I, ANTONIO BASELLI, doctor of philosophy and chemist, a subject of the Emperor of Austria - Hungary, and resident of Basel, Switzerland, have invented new and useful Earth-Alkali Salts of Diiodo - Fatty Acids of High Molecular Weight and a Process of Making Same, of which the following is a full, clear, and exact specification.

I have found that new earth-alkali salts of di-iodo-fatty acids of high molecular weight are obtained smoothly by acting directly with iodin on earthalkali salts of the unsaturated higher fatty acids. The attachment of the iodin occurs easily and quantitatively. Owing to their great content of iodin these new earthalkali salts of diiodo-fatty acids of a high molecular weight have valuable therapeutical properties; they constitute in dry state white crystalline powders insoluble in water and alcohol, difficultly soluble in ether and ethylacetate, but easily soluble in carbon tetrachlorid and toluene and resisting to the action of air and of light.

Example I: 34.5 parts of magnesium behenolate are dissolved in 170 parts of carbon tetrachlorid. To the solution there are added 25 parts of iodin and 0.5 part of ferrous iodid and the mixture is first stirred for some time at the ordinary temperature and then heated for about 10 hours in a reflux apparatus. The mass is allowed to cool, the reaction liquid is shaken with a solution of sodium thiosulfate for the purpose of separating a small quantity of free iodin and dehydrated by means of calcined Glauber salt and finally the greater part of the slovent is distilled. The remaining residue is recrystallized from ethylacetate, whereby the magnesium salt of the di-iodo behenolic acid is obtained in the form of colorless lustrous laminæ which are not changed by a long contact with air or by a long exposure to light. The di-iodobehenolate of magnesuim is insoluble in water and alcohol, difficultly soluble in ether and ethylacetate, but easily soluble in carbon tetrachlorid and toluene.

If in the foregoing example the calcium salt of the behenolic acid be employed, the calcium salt of behenolic acid di-iodid is obtained in an analogous manner, this latter body being a white, finely crystallized powder and having the same behavior against solvents as the corresponding magnesium salt.

Example II: 29 parts of the magnesium salt of stearolic acid are dissolved in 250 parts of carbon tetrachlorid and mixed with 25 parts of iodin and 0.5 part of ferrous iodid and the mixture is heated for about 10–12 hours in a reflux apparatus. After cooling, the reaction mass is worked up as described in Example I, whereby the magnesium salt of the stearolic acid di-iodid is obtained in the form of colorless laminæ.

The other earthalkali salts of the diiodostearolic acid are prepared in an analogous manner. The attachment of the iodin occurs also in the same manner, when the earthalkali salts of other unsaturated higher fatty acids are employed.

What I claim is:

1. The described process for the manufacture of salts of diiodo fatty acids of a high molecular weight, consisting in treating the salts of the unsaturated higher fatty acids with iodin.

2. The described process for the manufacture of earthalkali salts of diiodo fatty acids of a high molecular weight, consisting in treating the earthalkali salts of the unsaturated higher fatty acids with iodin.

3. As new products, the described earth-alkali salts of diiodo fatty acids of a high molecular weight, which have, owing to their great content of iodin, valuable therapeutical properties, constitute in a dry state white crystalline powders insoluble in water and alcohol, difficultly soluble in ether and ethylacetate, but easily soluble in carbon tetrachlorid and toluene and resisting to the action of air and of light.

In witness whereof I have hereunto signed my name this tenth day of December 1910, in the presence of two subscribing witnesses.

ANTONIO BASELLI.

Witnesses:
 GEO. GIFFORD,
 AMAND BRAUN.